United States Patent
Rocka

[15] 3,653,144
[45] Apr. 4, 1972

[54] FISHING ROD AND REEL STORAGE DEVICE

[72] Inventor: Arthur J. Rocka, Box 276, Route 1, Tomball, Tex. 77375

[22] Filed: Apr. 23, 1970

[21] Appl. No.: 31,280

[52] U.S. Cl............................................43/54.5, 43/21.2
[51] Int. Cl..................................A01k 97/00, A01k 97/10
[58] Field of Search...........................43/21.2, 27.4, 26, 54.5

[56] References Cited

UNITED STATES PATENTS

| | | | |
|---|---|---|---|
| 2,311,823 | 2/1943 | Gaskill | 43/21.2 |
| 2,309,350 | 1/1943 | Nanasko | 43/21.2 |
| 2,596,403 | 5/1952 | Hoffman | 43/54.5 R X |

Primary Examiner—Samuel Koren
Assistant Examiner—G. M. Yahwak
Attorney—Pravel, Wilson & Matthews

[57] ABSTRACT

Fishing rod and reel storage apparatus wherein the reel of the fishing rod is situated in a confining holder with an opening insertion and removal of the reel from the holder easily and quickly. The holder is positioned at an angle to a supporting bracket and the fishing rod extends through the space formed by the angle.

7 Claims, 2 Drawing Figures

PATENTED APR 4 1972 3,653,144
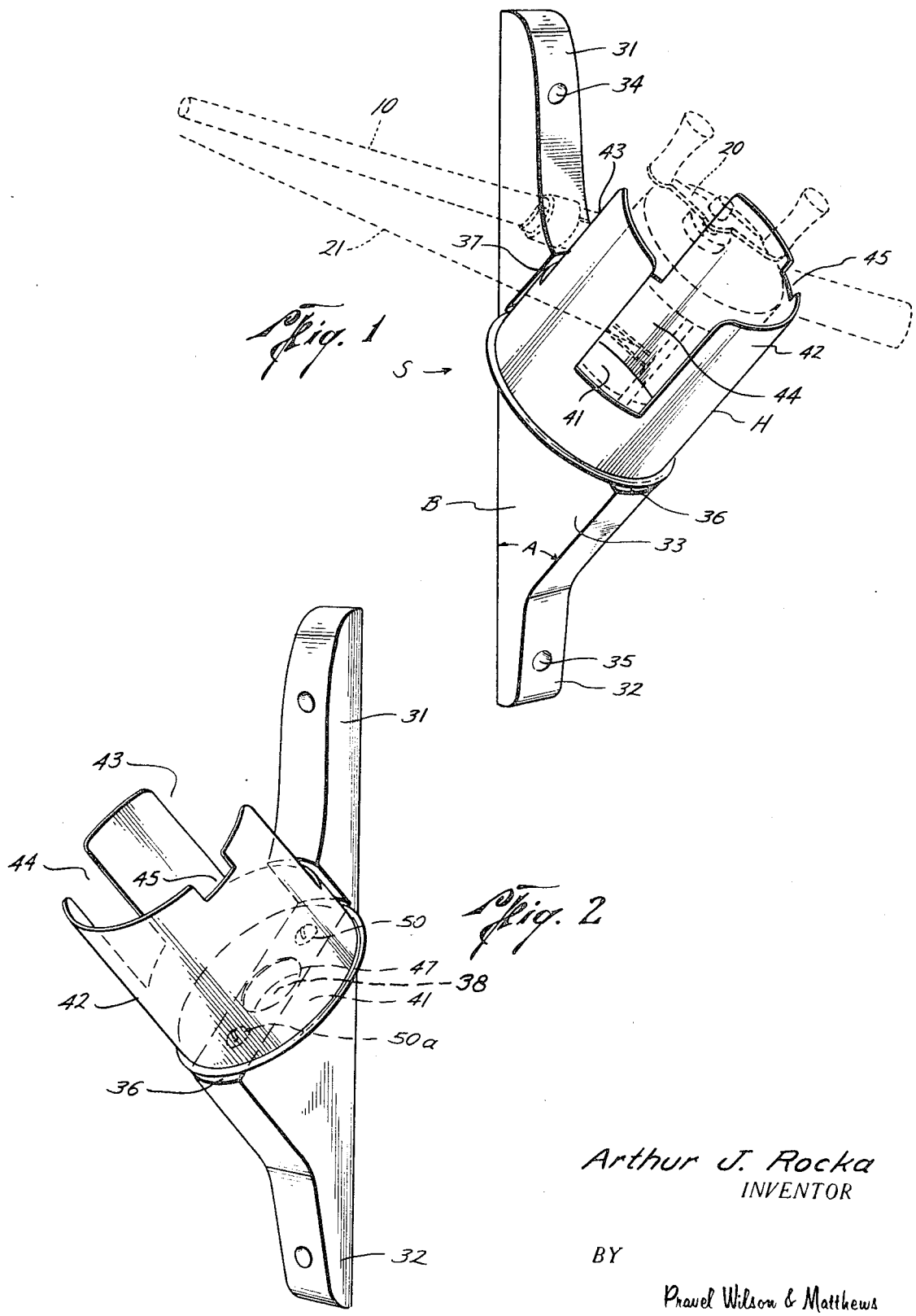
Arthur J. Rocka
INVENTOR
BY
Pravel Wilson & Matthews
ATTORNEYS

3,653,144

FISHING ROD AND REEL STORAGE DEVICE

BACKGROUND OF THE INVENTION

The field of this invention relates to storage devices for fishing rods and reels.

So far as is known, no satisfactory storage device for a fishing rod and reel has been provided wherein the rod and reel are both supported by the reel alone. Prior storage devices have been racks or holders which supported the rod and reel by supporting the rod in a vertical position with the handle of the rod resting on the rack, or with one eye of the rod suspending the rod from a clip or rack.

Storing the rod in a boat in a vertical position is undesirable because of space limitations in a boat, and also because movements of the boat cause the flexible stem of the fishing rod to move the fishing hook about the boat at approximately the level of the boat passenger's head, which is extremely dangerous.

Storing the fishing rod horizontally on the floor of a boat, or in a bracket holding the rod at spaced points, has not been satisfactory either. When stored on the floor, the rod is exposed so that it may be stepped on by a boat passenger, causing damage to either the rod or the passenger, or both. When the rod is supported on spaced brackets or clips, an extreme sag in the rod often develops which may be detrimental.

SUMMARY OF THE INVENTION

Briefly the present invention provides a fishing reel storage device mounted so that the fishing reel, and also usually the rod therewith, can be stored when not in use, but so that the reel can be easily grasped in one hand by a user and quickly removed for use. A reel may be stored along or together with a rod.

BRIEF DESCRIPTION OF THE DRAWINGS

FIG. 1 is an isometric view of the fishing rod and reel storage device of the present invention, with a reel and a fishing rod shown in dotted lines; and FIG. 2 is another isometric view of the storage device of this invention illustrating further details thereof.

DESCRIPTION OF THE PREFERRED EMBODIMENT

In the drawings, the letter S depicts a storage device according to the present invention comprising a supporting bracket B and a reel supporting means or holder H suitably secured to the supporting bracket B. A fishing reel 20 and, if desired, an attached fishing rod 10 are held in an easily accessible position to the user within the reel holder H. The reel 20 and rod 10 are illustrated in dotted lines (FIG. 1) in order not to obscure the structural detail of the storage device S, and because various types and models of reels with or without rods may be stored with the apparatus of the present invention.

The supporting bracket B is made of wood, metal, plastic or other suitable material, and has a first end 31 and a second end 32. An arm 33 of supporting bracket B is located intermediate the first end 31 and second end 32, extending transversely from the bracket B at a preferably acute angle A, if the storage device is desired to be attached to a vertical surface as will be later described. The acute angle A may be any desired acute angle so long as it insures an opening through which the rod 10, if attached to the reel 20, may pass when the reel 20 is positioned in holder H as will be later described, and allows easy access to the reel 20 by the user.

The supporting bracket B has a longitudinal rear attaching surface (not shown) along which such bracket may be attached to a suitable surface such as a bulkhead, a side of a boat, a side or top of an automobile, truck, or trailer, or a wall of a building, garage or home, by suitable attachment techniques such as gluing, bonding, screwing or nailing. If nailing or screwing attachment techniques are used, a plurality of passages 34 and 35 through the supporting bracket are provided for passage of the nails or screws through the bracket B.

If the bracket B is attached to a horizontal surface, the angle A at which the arm 33 extends transversely from the bracket B would be perpendicular, and the arm 33 would also be somewhat shorter. It might additionally be desirable to mount the holder H directly to the surface of the bracket B, omitting the arm 33 when the bracket B is attached to a horizontal surface.

An attachment surface 36 of the arm 33 is formed along a plane, preferably perpendicular to the angle A at which the arm 33 extends from the bracket B, to provide a surface to which the reel holder H may be attached. A surface 37 of the bracket B is provided, against which the holder H is positioned.

The holder H extends at the angle A from the bracket B and is made of wood, metal, plastic or other suitable material, and comprises a base member 41 and a wall member 42 which confines the reel 20 when such reel is positioned in the storage device of the present invention.

An aperture 43 is formed in the wall member 42 for passage of the connection between the reel 20 and the rod 10, if attached, when such reel is positioned in the storage device, so that the rod 10, if attached to the reel 20, passes through the opening between the holder H and the bracket B, and the reel 20 and rod 10 are easily accessible to the user. A second aperture 44 is formed in the wall member 42 for passage of a portion 21 of the fishing line contained in the reel 20.

Depending upon the configuration of the reel 20 confined in the holder H, other apertures as illustrated by an aperture 45 may be formed in wall member 42 to allow other knobs or extensions extending from the reel 20 to pass through the wall member 42 when the reel 20 is being confined. If desired, a coating or tubing or collar may be applied to the surfaces of wall member 42 adjacent apertures 43, 44 and 45, if such surfaces are rough or sharp, for safety purposes, such as to prevent nicks or cuts on the user's hand.

In FIG. 2, the attachment of base member 41 to attachment surface 36 by a pair of screws 50 and 50a is shown. Other suitable attaching techniques such as nailing, gluing or bonding could also be utilized. A circular aperture 47 is formed in base member 41 of holder H to allow passage therethrough of an end of the axle (not shown) of the fishing reel 20 when such reel is positioned in holder H. A circular socket 38 is formed in the attachment surface 36 by drilling or other suitable techniques to allow the end of the axle to extend through the aperture 47.

Although the holder H and the bracket B are described and shown as separate members which are attached to each other, it should be realized that the holder H and the bracket B may be integral with respect to each other, formed from one piece of material by casting, molding or other suitable techniques.

Although the wall member 42 is shown in the drawings as being cylindrical in configuration, it should be realized that other configurations of such wall member 42 are also possible, depending upon the type of reel 20 being enclosed within such wall member 42.

Additionally, it should be recognized that although the storage device S has been described as storing a reel 20 alone, such device is also adapted to store the reel 20 when a rod 10 is attached to such reel.

The reel holder H of the present invention is useful in situations where a user has several fishing reels, each containing a different test strength fishing line, which he desires to have readily accessible to him while fishing.

The foregoing disclosure and description of the invention are illustrative and explanatory thereof, and various changes in the size, shape, and materials as well as in the details of the illustrated construction may be made without departing from the spirit of the invention.

I claim:

1. A device for the storage of a fishing rod and reel, comprising:

a. a supporting bracket adapted to be attached to a surface;

b. reel supporting means for removably receiving and holding a reel to thereby support the reel, said reel supporting means including a housing means adapted to confine the reel when the reel is being stored in the storage device and having an opening therein for receiving the fishing reel;

c. means for securing said reel supporting means to said supporting bracket at an angle with respect thereto for positioning the reel in a readily accessible position within said reel supporting means; and d. said reel supporting means and said supporting bracket having surfaces forming an opening between said reel supporting means and said supporting bracket for positioning the fishing rod.

2. The structure of claim 1, further including:

a. said supporting bracket including a first member having a longitudinal surface along which said bracket is attached to the surface; and b. said supporting bracket further including an arm extending from said first member in a direction transverse that of said longitudinal attaching surface at an angle corresponding to the angle between said supporting bracket and said reel supporting means wherein the fishing rod can be positioned.

3. The structure of claim 2, further including:

a. said arm extending from said first member in a direction substantially perpendicular that of said longitudinal attaching surface.

4. The structure of claim 1, wherein said housing means comprises a substantially cylindrical housing means and further including:

a. said bracket having an attachment surface on which said cylindrical housing means is attached; and b. said cylindrical housing means including:
   1. a base member for engaging said attachment surface of said supporting bracket and for supporting the reel in said housing; and
   2. a wall member extending away from said base member and said supporting bracket, having a first aperture therein for passage therethrough of the connection between the fishing rod and the reel.

5. The structure of claim 4, further including:

a. said wall member having a second aperture therein for passage therethrough of the fishing line.

6. The structure of claim 5, further including:

a. said base member having an aperture therein for passage therethrough of an end of the axle of said fishing reel.

7. The structure of claim 1, further including:

a. said supporting bracket and said reel supporting means being integral with respect to each other.

* * * * *